J. C. LINCOLN.
VARIABLE SPEED ELECTRIC MOTOR.
APPLICATION FILED MAY 2, 1905.
1,194,645.
Patented Aug. 15, 1916.
3 SHEETS—SHEET 1.
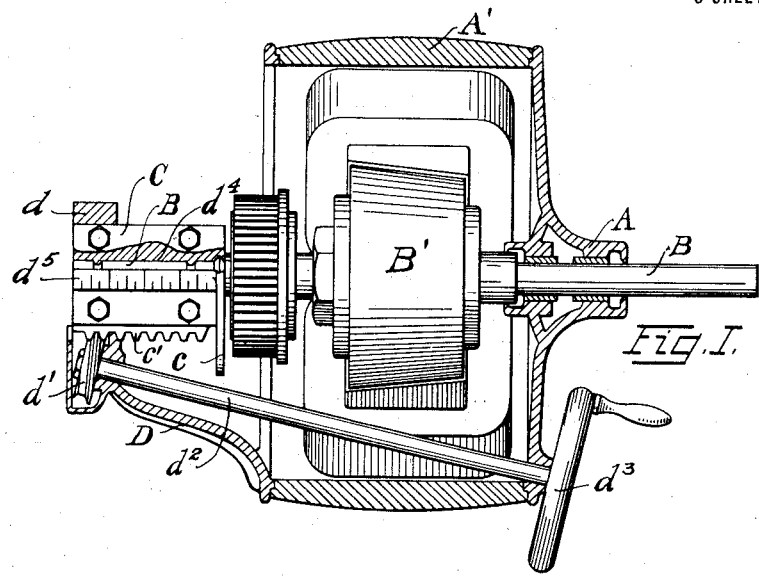
Fig. I.
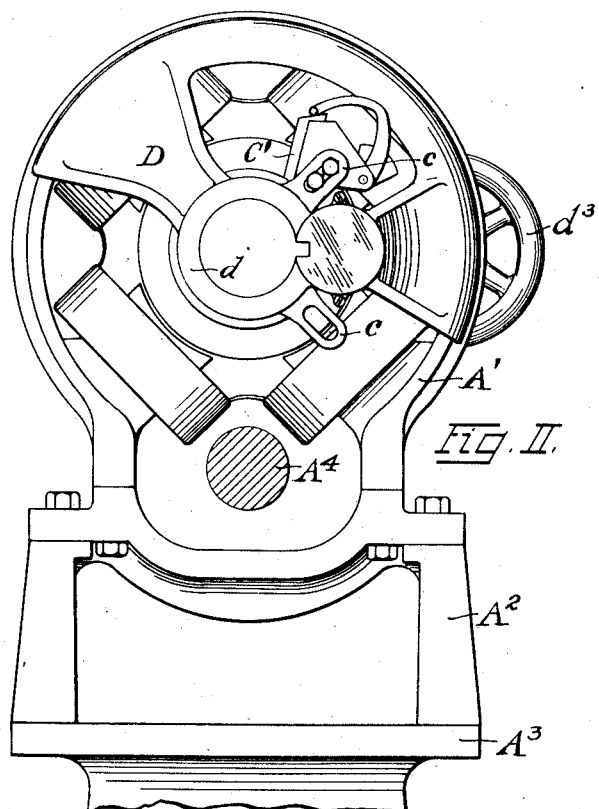
Fig. II.
Witnesses:
Inventor,
John C. Lincoln
by his attorney.

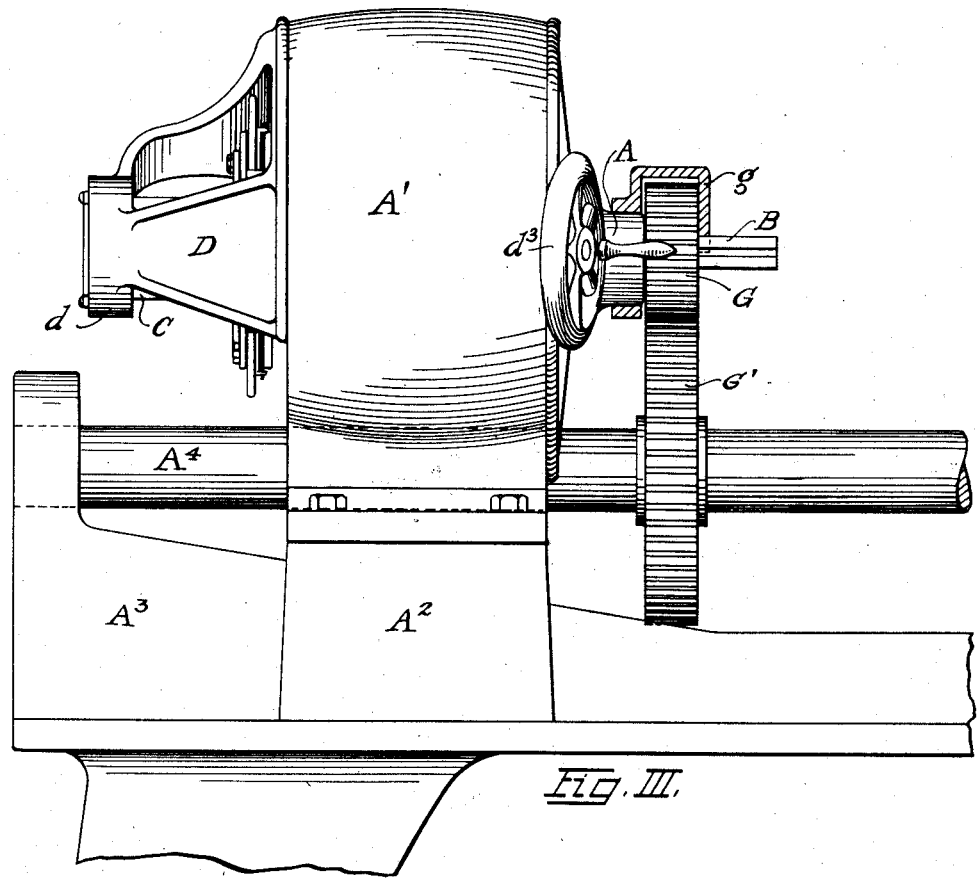

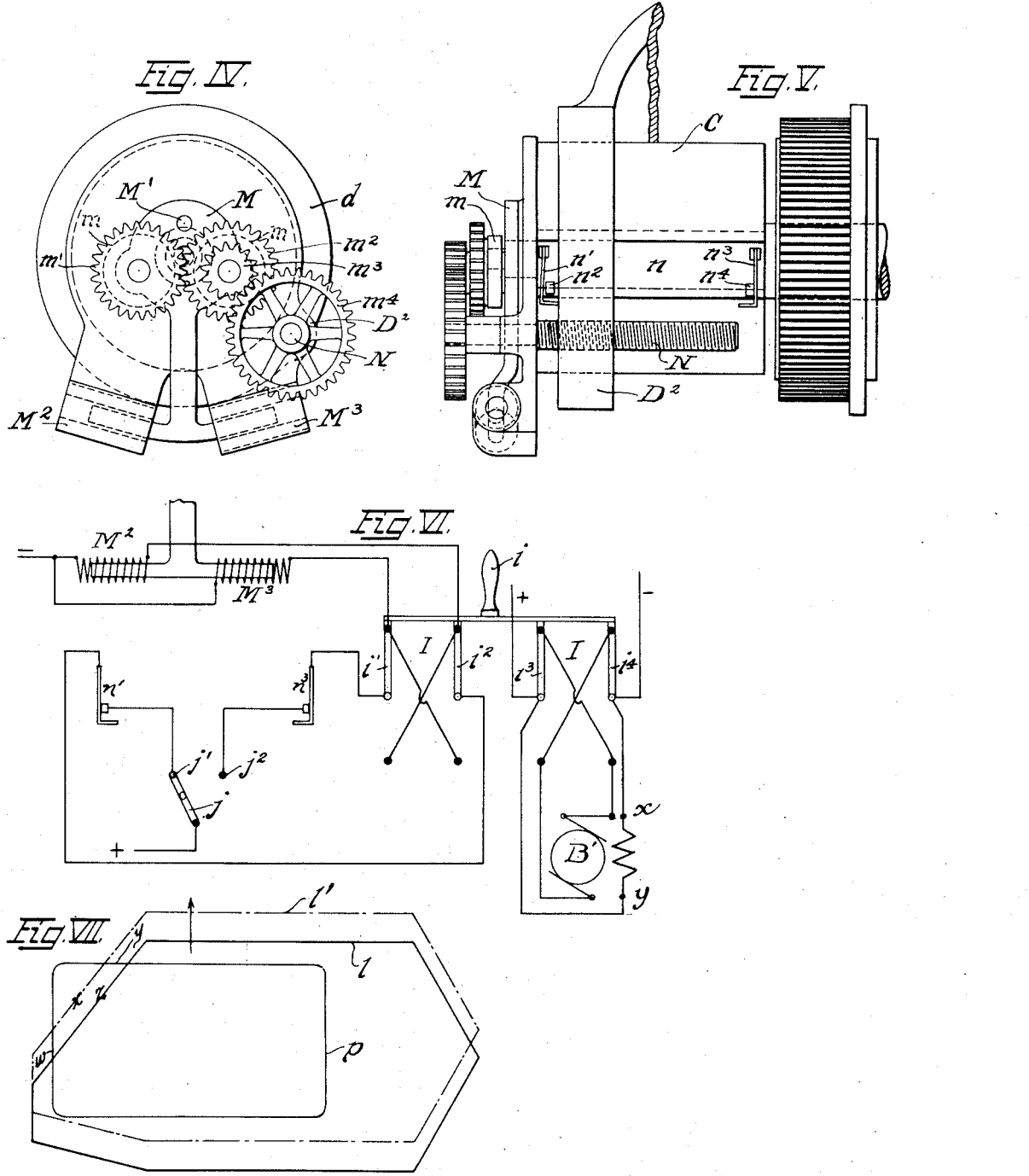

UNITED STATES PATENT OFFICE.

JOHN C. LINCOLN, OF CLEVELAND, OHIO, ASSIGNOR TO THE LINCOLN COMPANY, OF CLEVELAND, OHIO, A CORPORATION OF OHIO.

VARIABLE-SPEED ELECTRIC MOTOR.

1,194,645. Specification of Letters Patent. Patented Aug. 15, 1916.

Application filed May 2, 1905. Serial No. 258,532.

*To all whom it may concern:*

Be it known that I, JOHN C. LINCOLN, a citizen of the United States of America, and a resident of Cleveland, in the county of Cuyahoga and State of Ohio, have invented certain new and useful Improvements in Variable-Speed Electric Motors, of which the following is a specification.

My invention relates to improvements in variable speed electric motors, and more particularly to those having the field and armature windings associated in shunt relation, and adapted for commercial use upon circuits energized by currents of practically constant potential.

The object of my invention has been to effect various improvements in electric motors of this class, whereby simple and efficient means are provided for conveniently employing the commonly used shunt wound motor in various ways, wherein the speed must be varied, and in better adapting the motor to the demands made in practical use.

My improvements will be described as applied to an electric motor designed for use upon lathes, although said improvements well adapt the motor to many other uses, as in printing presses, mechanical cranes, electric launches, and the like.

The features of my invention are summarized in the claims, and the structural details of said features may be briefly stated as consisting in providing a motor, wherein an armature of frusto-conical shape is equipped with means, as a screw mechanism, for longitudinally moving said armature into and out of the field of the motor, whereby the armature-speed is varied; in providing a bridge for the field-structure, permitting a compact arrangement of the motor and lathe or similar structure, and their respective gearing; in providing convenient means for controlling the speed of the motor from a distance, by a suitable arrangement of circuits and switches, whereby the reversal of the motor does not alter the control of the governing switch; and in providing electrically-controllable screw-adjusting mechanism, associated with the armature and governed by said switching apparatus; and in providing a composite field-structure for improving the magnetic conductivity thereof, and in winding the armature of such motor in a manner to minimize sparking at the brushes during the operation at variable speeds.

My improvements will be more readily gathered by making particular reference to the figures of the accompanying drawings, illustrating by diagram and in detail, embodiments of my invention, wherein:—

Figure I., is a transverse sectional view of a variable speed motor conforming with my improvements. Fig. II., is an end elevation thereof. Fig. III., is a front elevation of said motor. Figs. IV. and V., illustrate the means which I employ in electrically controlling the speed of such motors; the same being drawn upon a somewhat enlarged scale. Fig. VI. diagrammatically sets forth the preferred circuit for accomplishing the control for the motor, and for varying its speed by a distance switch. Fig. VII., likewise is a diagram indicating upon a plane, the positioning of the armature windings, in order to reduce sparking at the brushes during commutation.

Throughout the several figures of the drawings, I have employed the same character of reference to indicate corresponding parts, in order to avoid mistake or confusion.

Referring to the first three figures of the drawings, it is seen that the motor construction corresponds in many particulars to the commercial shunt-wound motor in extensive use to-day. The field-structure of this motor, however, is adapted for use upon a lathe, wherein it is highly desirable to mount the armature shaft and the lathe shaft with their respective gears in close proximity. Accordingly, the frame or iron field-casting A' is open below, and is provided with a bridge A², which also extends across the lathe-bed A³; the parts being securely bolted or cast together, with the bridge forming a magnetic yoke uniting the open portion of said field-casting below the main shaft A⁴ of the lathe.

The motor armature B' is equipped with an extended shaft B, mounted at either side of the armature respectively in a fixed and a traveling bearing, so that the armature and shaft may be shifted endwise in the direction of the shaft axis, as will be explained.

The right hand bearing is of ordinary construction, and the shaft B of the armature is mounted therein so as to be slidable within said bearing A, in the direction of its axis, as will be readily understood. The opposite end of the shaft which carries the commutator is mounted in a box C, which latter carries fixed standards $c$ to which the brushes C' are attached. This box is of cylindrical form and is mounted in a support D, having a bearing $d$ in which the said box is capable of moving toward the left, in the direction of the shaft axis.

Secured to the side of the slidable bearing or box, is a rack $c'$, which engages a coacting screw-head $d'$ carried at the end of the adjusting-shaft $d^2$, and operated by means of the hand-wheel $d^3$. By means of this adjustment, the bearing which is carried upon the bracket D is made adjustable under the influence of the screw. Said bearing is interiorly babbited at $d^4$, and has annular rings engaging grooves in the armature shaft B, whereby said shaft is securely retained within the bearing. A scale $d^5$ may be provided to indicate the lateral displacement of the armature and shaft, and consequently, the speed of the armature, as will later appear.

The armature and fields, as stated, will be understood to be in shunt relation; said armature B' preferably conforming closely to the faces of the polar extremities of the field when in normal position. The interior armature-receiving space formed by the said structure is made of frusto-conical form, as shown, the minor base of such space being upon the side of the motor farthest removed from the adjustable bearing C. The armature B' is made of corresponding frusto-conical form, so that the field-structure will present an inner surface of frusto-conical contour, and the armature $a$, corresponding parallel surface of frusto-conical contour.

Assuming the armature and field-structure to be in the position illustrated in the drawings, and that it is desired to vary the speed of the motor effected by a given constant current passing through the field windings, it is merely necessary to draw the armature partly out of the armature space of the field by actuating the hand-wheel $d^3$ and adjusting screw $d'$ for moving the armature shaft and armature to the left, as desired. Such action increases the reluctance of the air-gap between the armature and the field, and so decreases the magnetic flux entering the armature. The counter electro-motive force of an armature is proportional to the product of the speed and the magnetic flux and such product is practically constant for a given primary electro-motive force. A decrease, therefore, of magnetic flux must be accomplished by an increase in speed, in order to maintain such constant product. Such withdrawal of the armature from the armature space of the field, reduces the area of the air-gap, and so effects an increase in the reluctance thereof. This effect would be produced with an ordinary armature-receiving space and an armature of plain cylindrical form, as will be readily understood. By introducing, however, the frusto-conical construction described, not only is the area of the air-gap decreased, but the length thereof is simultaneously increased, thus further increasing the reluctance thereof. This increase of reluctance thus is effected through two agencies, namely, the decrease of the area and the increase of the length of the air-gap, so that a greater increase in the reluctance, and, in consequence, more marked variation in the speed of the motor is effected for a given movement of the armature out of the armature space, than would be the case were the construction cylindrical instead of frusto-conical. The latter form is hence my preferred form, but I do not wish it understood that the main principle of my invention is limited by such construction, since it will be readily understood by those skilled in the art, that an effective variable speed motor may be constructed along the lines herein set forth, employing however, the ordinary type of armature and armature-receiving space. This method of control, I may point out, is far more simple, practical and efficient in regulating the speed of the modern shunt wound motor, than is the suggested variation of the air-gap through the bodily actuation of the pole pieces from or toward the inclosed armature; this for the reason that much more complicated construction is required for actuating each of the pole pieces, than is demanded by the longitudinal movement of the armature into and out of the armature space provided by such pole pieces.

For the purpose of transmitting power from the armature, I have mounted the pinion G upon the shaft B, by means of a feather and groove; holding the pinion so that the shaft may slide longitudinally therethrough by means of a casting $g$. The pinion G meshes with a co-acting gear G' mounted upon the shaft or spindle $A^4$ of the lathe, thus transmitting motion thereto. It will be observed that said spindle extends through the field-structure of the motor, and that a very compact and efficient arrangement results therefrom. The gap in the lower portion of the field-casting, as stated, is bridged by a magnetic body $A^2$, extending beneath said spindle, and carrying the motor as well. The part accordingly serves to close or bridge the magnetic circuit between the extended poles of the field-structure.

In Figs. IV and V., I have shown means for electrically operating the screw-adjusting mechanism of the motor. This comprises a frame M, pivotally mounted at M' upon the movable or traveling bearing of the motor. Two solenoids $M^2$ $M^3$, acting upon the lower portion of said frame M, are adapted respectively to bring the rollers $m$ of one or the other of the pinions $m'$ $m^2$ against the reduced cylindrical extension of the armature shaft, thereby driving said gears in one direction or the other, depending upon which roller is engaged with the shaft. An intermediate reducing gear $m^3$, $m^4$ transmits motion to the screw N, which enters a tapped opening in the support or bearing $D^2$, at the left of the motor. Consequently, when said screw is rotated in either direction by means of the gearing, the armature will be moved into or out of the magnetic field of the motor, just as was explained in connection with the hand-operating device, and the speed will be varied, as before. This result, as indicated, is controlled by the solenoids $M^2$, $M^3$, and since this arrangement is designed for control from a distance, I have provided automatic means for opening the circuit through one or the other of said solenoids respectively, when the limit-switches are operated and the maximum or minimum speed of the motor is attained. This is accomplished by means of the separable contacts $n'$, $n^2$, and $n^3$, $n^4$, respectively connected in circuit with the solenoids, said contacts being mounted upon the fiber plate $n$, and being positioned to engage an insulated surface upon the support $d$ in the extreme positions of adjustment for the movable bearing. Thus in Fig. V., the left hand contacts $n'$, $n^2$ are separated, opening the circuit through the left hand solenoid; it being assumed that the motor is operated under conditions of its lowest speed.

Referring now to the diagram, Fig. VI., I represents a composite double-throw switch for reversing the current through the armature B' of the motor, and, in consequence, reverses its direction of rotation. Connected therewith and operated by the same handle $i$, is a second switch for simultaneously shifting the current through the solenoids $M^2$, $M^3$. The switch $j$ is the speed-varying switch contacting with points $j'$, $j^2$, to close the circuit through one or the other of said solenoids, and thus control the speed of the motor from a distance, as when used upon printing presses. The + and − conductors, it will be understood, extend to a common power circuit. By the arrangement indicated in the diagram, the switch $j$ is thus made to control the speed of the armature in a given position, irrespective of the direction in which the motor is operated, since by reason of the composite double-throw switch I, current is transferred from one to the other of the speed-controlling solenoids $M^2$, $M^3$, when it is reversed through the armature B'. Thus when the switch-blades $i'$, $i^2$, $i^3$, and $i^4$, engage the uppermost contacts, current will be supplied to solenoid $M^2$, to adjust the motor to operate at a relatively lower speed; switch $j$ being upon contact $j'$, while with the motor driven in a reversed direction, current will be supplied to the other solenoid $M^3$, to secure the same result. This follows from the fact that the gearing $m^3$, $m^4$, of course, rotates with the armature, its direction depending upon which of the friction-rollers associated with the pinions $m'$, $m^2$, is brought into engagement with the cylindrical end of the armature shaft through the excitation of one or the other of said solenoids $M^2$, $M^3$.

The diagram of Fig. VII., is intended to illustrate the preferred winding or disposition of the windings upon the armature of my improved motor; the solid line $l$ indicating the configuration of any one of such windings developed upon a plane surface. The rectangle $p$ indicates the position of any one of the pole pieces of the motor at the commencement of commutation, and the figure $l'$ in dotted lines, indicates the position of the armature winding above considered at the conclusion of commutation; the direction of motion of the armature being indicated by the arrow. It will be observed that the armature windings, as developed, are not symmetrical in outline; the right hand portion thereof showing the ordinary mode of positioning the windings upon a drum armature, and the left hand portion indicating my improved disposition of such windings. It is found that a motor which operates with a negligible sparking at its brushes under conditions of low or ordinary speed, will at high speeds frequently develop serious sparking conditions. Accordingly, by my improved winding of the armature, I have sought to overcome such condition, by inducing in the armature coil during the period of commutation when such sparking is caused, a counter electro-motive force sufficient to avoid this undesirable feature.

Referring again to the diagram, Fig. VII., it will be seen, that inasmuch as the armature has been moved from its normal position, laterally to the right beneath the stationary pole piece $p$, a continually increasing area, which increase during the period of commutation is represented within the figure $w$, $x$, $y$, $z$, is subjected to the field of force, and consequently a counter electro-motive force is set up in the winding in question, which opposes and tends to neutralize or reverse the current, which otherwise would produce sparking at the brushes. It will be understood that each short circuited coil under commutation successively is cutting a flux of the sign of the pole, which it is leaving, thereby tending to reverse the current therein, and initiate its flow in the opposite direction, when said coil leaves the brush. The neutralizing action is secured by my improvement at the critical moment of commutation. Assuming that the full-line position shown in said diagram, is the position of any winding at the beginning of the period of commutation, and that the dotted lines indicate such position at the conclusion of commutation, there will be a voltage generated in the coil or winding, proportional to the change of flux encountered by said coil or winding between these two positions respectively. This change in flux is proportional to the area beneath the pole-piece $p$, the difference in area being embraced between lines $x$ and $z$, and the flux will be such as will tend to overcome the self-induction of the coil, thereby greatly improving commutation. By proper design, the resulting voltage generated during the instant of short circuiting, may be made great enough entirely to overcome the self-induction, and thus insure sparkless commutation. This action may be compared with that produced under a commutating-pole, although, in the apparatus herein shown, it is secured in a different manner and by means of a laterally movable armature, shifted beneath the pole-pieces of the motor.

The statement above will be better understood, when the areas compared are made to relate directly to the flux of magnetic lines within the respective areas emanating from the pole piece $p$, under consideration. By thus modifying the armature windings so that the end portions may be brought into an increasing area of the magnetic field during the moment of commutation, I have accordingly overcome in large measure the tendency of the motor to spark at high speeds.

Having now described the preferred embodiments of my invention, and of the several features relating to the structure shown, which I may state are capable of independent uses not necessarily related to each other, I claim as new, and desire to secure by these Letters Patent, the following:—

1. In a variable speed electric motor, the combination with a field-structure, of the armature excited thereby; an exciting circuit for the field-structure in shunt relation with said armature, a movable bearing supporting and in given relation with said armature and its commutator structure, and means for withdrawing the armature axially from the field structure and retaining it in adjusted positions, substantially as set forth.

2. In a variable speed electric motor, the combination with a field-structure, of the armature excited thereby; the same conforming to each other and having respectively inner and outer faces of frusto-conical contour, an exciting circuit for the field-structure in shunt relation with said armature, a movable bearing supporting and in given relation with said armature and its commutator structure, and means for withdrawing the conical armature axially from the field-structure and retaining it in adjusted positions, substantially as set forth.

3. In a variable-speed constant-potential electric-motor, the combination with the field structure and its armature connected in shunt relation therewith, of means for securing their relative movement in line with the axis of the armature, whereby the latter may be operated in positions partially withdrawn from said field structure, and means associated with the armature for subjecting the armature windings or coils to an increase in effective flux during the respective periods of commutation, proportional to the withdrawal of said armature, substantially as set forth.

4. In an electric-motor of the class described, the combination with a single or unitary field-structure, of an exciting circuit therefor, in shunt relation with the armature, an armature having a core of approximately the same width as the field structure, means for effecting the partial operative withdrawal of the armature axially from its field structure for varying its speed of rotation; said armature having means associated therewith for successively producing an increase in voltage within its coils during the moment of commutation and proportional to the speed of the armature, substantially as set forth.

5. In a variable-speed constant-potential electric-motor, of the general class set forth, the combination with a single field-structure normally excited by shunt windings thereon, of an armature having a core approximately the width of the field poles mounted normally to rotate thereunder, suitable mechanism for effecting the lateral movement or adjustment of the armature and field structure to vary the speed of rotation; said armature and field having associated means for producing an increase in voltage during the period of commutation, proportional to the withdrawal of the armature from the field, substantially as set forth.

6. In a variable speed constant potential electric motor, the combination with a single stationary field-structure, of an exciting circuit therefor in shunt relation with the armature, an armature having a core of substantially the width of the field-poles, means for subjecting the armature windings to a proportional effective increase of flux during the period of commutation during withdrawal of the armature from said field-structure, and means for effecting such partial axial withdrawal of the armature to increase its speed of rotation, substantially as set forth.

7. In a variable-speed constant-potential electric-motor, the combination with a field-structure, of an exciting circuit therefor, in shunt relation with the armature, a frusto-conical armature normally rotatable within the conforming field structure; the field poles and armature core being of substantially the same width, mechanism for relatively adjusting and retaining in adjusted position the said structures in the direction of the armature axis, and means associated with the field and armature for producing an increase in voltage within the armature coils during the period of commutation and proportional to the speed of the armature, substantially as set forth.

Signed at Cleveland, this 28th day of April, 1905, in the presence of two subscribing witnesses.

JOHN C. LINCOLN.

Witnesses:
CLARE P. JOHNSON,
HERBERT LYNN LAWRENCE.